US012734753B2

(12) United States Patent
Huber

(10) Patent No.: US 12,734,753 B2
(45) Date of Patent: Sep. 15, 2026

(54) APPARATUS AND METHOD FOR ACCURATELY LEVELING A BUILD PLATE

(71) Applicant: 3D Systems, Inc., Rock Hill, SC (US)

(72) Inventor: John Michael Huber, Escondido, CA (US)

(73) Assignee: 3D SYSTEMS, INC., Rock Hill, SC (US)

( * ) Notice: Subject to any disclaimer, the term of this patent is extended or adjusted under 35 U.S.C. 154(b) by 112 days.

(21) Appl. No.: 18/890,911

(22) Filed: Sep. 20, 2024

(65) Prior Publication Data

US 2025/0114999 A1 Apr. 10, 2025

Related U.S. Application Data

(60) Provisional application No. 63/588,782, filed on Oct. 9, 2023.

(51) Int. Cl.
*B29C 64/245* (2017.01)
*B29C 64/124* (2017.01)
(Continued)

(52) U.S. Cl.
CPC .......... *B29C 64/245* (2017.08); *B29C 64/124* (2017.08); *B29C 64/232* (2017.08);
(Continued)

(58) Field of Classification Search
CPC ... B29C 64/227; B29C 64/232; B29C 64/236; B29C 64/241; B29C 64/245;
(Continued)

(56) References Cited

U.S. PATENT DOCUMENTS 2,116,122 A * 5/1938 Ocenasek .............. B23D 57/00 409/190
7,690,909 B2 4/2010 Wahlstrom
(Continued)

FOREIGN PATENT DOCUMENTS

WO 2022/235549 A1 11/2022

OTHER PUBLICATIONS

PCT International Search Report for International Search Authority for PCT/US2024//047590, mailed Jan. 3, 2025 (5 pages).
(Continued)

*Primary Examiner* — Xiao S Zhao
*Assistant Examiner* — Nicholas J Chidiac

(57) ABSTRACT

A 3D printing system includes a resin vessel, a build plate positioning mechanism, a plurality of lower datums, and a build plate. The build plate positioning mechanism includes a pair of L-shaped brackets that individually include a fixed vertical portion, a movable portion, and an adjustment mechanism. The movable portion includes a lateral lower end. The adjustment mechanism is configured to adjust and set an angular position of the lateral lower end with respect to the fixed vertical portion. The build plate has a plurality of upper datums configured to engage and align to the plurality of lower datums when the build plate is placed upon the pair of L-shaped brackets. The plurality of lower datums are arranged upon the pair of L-shaped brackets to enable the adjustment mechanisms of the pair of L-shaped brackets to provide an independent angular adjustment of the build plate along two lateral axes.

20 Claims, 8 Drawing Sheets

(51) Int. Cl.

| | |
|---|---|
| ***B29C 64/232*** | (2017.01) |
| ***B29C 64/241*** | (2017.01) |
| ***B29C 64/393*** | (2017.01) |
| ***B33Y 10/00*** | (2015.01) |
| ***B33Y 30/00*** | (2015.01) |
| *B33Y 50/02* | (2015.01) |

(52) U.S. Cl.
CPC .......... *B29C 64/241* (2017.08); *B29C 64/393* (2017.08); *B33Y 10/00* (2014.12); *B33Y 30/00* (2014.12); *B33Y 50/02* (2014.12)

(58) Field of Classification Search
CPC ........ B29C 64/124; B22F 12/30; B22F 12/33; B22F 12/37; B23Q 3/04
See application file for complete search history.

(56) References Cited

U.S. PATENT DOCUMENTS

| | | | | |
|---|---|---|---|---|
| 11,472,106 | B2 * | 10/2022 | Dravantti | B33Y 30/00 |
| 11,485,079 | B2 * | 11/2022 | Durand | B22F 12/222 |
| 2015/0276119 | A1 * | 10/2015 | Booker | B29C 64/118<br>248/561 |
| 2021/0260824 | A1 * | 8/2021 | Dravantti | B29C 64/245 |
| 2022/0193996 | A1 * | 6/2022 | Durand | B29C 64/393 |
| 2024/0181534 | A1 * | 6/2024 | Aggarwal | B22F 12/222 |

OTHER PUBLICATIONS

PCT Written Opinion for International Search Authority for PCT/US2024//047590, mailed Jan. 3, 2025 (8 pages).

* cited by examiner

APPARATUS AND METHOD FOR ACCURATELY LEVELING A BUILD PLATE

CROSS-REFERENCE TO RELATED APPLICATIONS

This non-provisional patent application claims priority to U.S. Provisional Application Ser. No. 63/588,782, Entitled "Apparatus and Method for Accurately Leveling a Build Plate" by John Michael Huber, filed on Oct. 9, 2023, incorporated herein by reference under the benefit of U.S.C. 119(e).

FIELD OF THE INVENTION

The present disclosure concerns an apparatus and method for the digital fabrication of three-dimensional (3D) articles by a layer-by-layer solidification of a photocurable resin. More particularly, the present disclosure concerns a way of very accurately leveling a build plate to a top surface of the resin.

BACKGROUND 3D printing systems are in wide use for prototyping and manufacturing articles. One type of 3D printing system utilizes a process called stereolithography. A typical stereolithography system utilizes a resin vessel, an imaging system, and a build plate within liquid resin held by the resin vessel. An article is manufactured in a layer-by-layer manner by selectively imaging and solidifying layers of the resin over the build plate. One challenge is that the build plate may not be parallel to an upper surface of the resin. This can result in a defective or partially missing article if imaging of the article is attempted on a non-level surface.

SUMMARY

In a first aspect of the disclosure, a three-dimensional (3D) printer includes a resin vessel, a build plate positioning mechanism, and a build plate. The build plate positioning mechanism includes a pair of brackets including a first bracket and a second bracket. The first bracket includes a first vertical section and a first lower end. The first lower end extends from the first vertical section along a lateral X-axis to a distal end. The first vertical section includes a first adjustment mechanism configured to rotatively position the first lower end about a first pivot axis. The first lower end includes two separated lower datums that are spaced apart along the X-axis. The second bracket includes a second vertical section and a second lower end. The second lower end extends from the second vertical section along the lateral X-axis to a distal end. The second vertical section includes a second adjustment mechanism configured to rotatively position the second lower end about a second pivot axis. The second lower end includes a central lower datum laterally located along the X-axis between the lateral X-axis locations of the two separated lower datums. The build plate is configured to be supported by a plurality of lower datums that include the two separated lower datums and the central lower datum. Actuating the first adjustment mechanism causes a relative vertical displacement of the two separated lower datums which rotates the build plate about a Y-axis which is perpendicular to the X-axis. Actuating the second adjustment mechanism causes a vertical displacement of the central lower datum which rotates the build plate about the X-axis. The first pivot axis and the second pivot axis can be individually parallel to the Y-axis. The central lower datum can generally engage the build plate at a midpoint between the separated lower datums with respect to the X-axis.

The disclosed build plate positioning mechanism allows a user to level the build plate on two axes by making adjustments well above the build plate and thus above the resin surface. Thus, this allows the leveling to take place when a top surface of the build plate is coincident or nearly coincident with a top surface of the photocurable resin. This makes visualization of the leveling very accurate by observing which portions of the top surface are dry versus being wetted by the resin. This method also avoids a user having to be in contact with or near the resin to do the adjustment which would otherwise be a safety issue.

In an implementation, the 3D printing system can include a vertical movement mechanism, an imaging subsystem, and a controller. The vertical movement mechanism is coupled to the build plate positioning mechanism and configured to position the build plate along a vertical Z-axis. The imaging subsystem is configured to selectively cure layers of photocurable resin above the build plate over a build plane. The controller is coupled to and configured to control the vertical movement mechanism and the imaging subsystem along with other portions of the 3D printing system.

In another implementation, the build plate includes a plurality of upper datums including two separated upper datums and a central upper datum configured to engage the separated lower datums and the central lower datum respectively. The plurality of lower datums include a plurality of magnets therein. The plurality of upper datums are formed from magnetic material that is magnetically coupled to the plurality of magnets when the build plate is placed upon the plurality of lower datums.

In another implementation, the build plate includes a plurality of upper datums including two separated upper datums and a central upper datum configured to engage the separated lower datums and the central lower datum respectively. The plurality of lower datums are openings having conical lead-in surfaces. The plurality of upper datums have truncated conical surfaces that are received by the conical lead-in surfaces when the build plate is loaded onto the plurality of lower datums.

In yet another implementation, the first vertical segment includes a first fixed vertical portion and a first movable portion that includes the first lateral lower end. Motion of the first fixed vertical portion is limited to vertical motion. The first mechanism is configured to angularly position the first movable portion with respect to the first fixed vertical portion about the Y-axis.

In a further implementation, the first vertical segment includes a first fixed vertical portion and a first movable portion that includes the first lateral lower end. Motion of the first fixed vertical portion is limited to vertical motion. The first fixed vertical portion includes a pin extending through the first movable portion along the Y-axis to allow rotation of the first movable portion with respect to the first fixed vertical portion about the Y-axis. The first vertical segment further includes a first actuator above the pin configured to allow a linear adjustment of relative location between the first movable portion and the first fixed vertical portion along the X-axis to provide an angular adjustment of the first lateral lower end about the Y-axis.

In a yet further implementation, the second vertical segment includes a second fixed vertical portion and a second movable portion that includes the second lateral lower end. Motion of the second fixed vertical portion is limited to vertical motion. The second mechanism is configured to angularly position the first movable portion with respect to the first fixed vertical portion about the Y-axis.

In another implementation, the second vertical segment includes a second fixed vertical portion and a second movable portion that includes the second lateral lower end. Motion of the second fixed vertical portion is limited to vertical motion. The second fixed vertical portion includes a pin extending through the second movable portion along the Y-axis to allow rotation of the second movable portion with respect to the second fixed vertical portion about the Y-axis. The second vertical segment further includes a second actuator above the pin configured to allow a linear adjustment of relative location between the second movable portion and the second fixed vertical portion along the X-axis to provide an angular adjustment of the second lateral lower end about the Y-axis.

In a second aspect of the disclosure, a 3D printing system includes a resin vessel, a build plate positioning mechanism, a plurality of lower datums, a build plate, a vertical movement mechanism, an imaging subsystem, and a controller. The build plate positioning mechanism includes a pair of L-shaped brackets that individually include a fixed vertical portion, a movable portion, and an adjustment mechanism. The fixed vertical portion is constrained to vertical motion. The movable portion is coupled to the fixed vertical portion. The movable portion includes a lateral lower end. The adjustment mechanism is configured to adjust and set an angular position of the lateral lower end with respect to the fixed vertical portion. The plurality of lower datums are arranged upon the pair of L-shaped brackets. The build plate has a plurality of upper datums configured to engage and align to the plurality of lower datums when the build plate is placed upon the pair of L-shaped brackets. The plurality of lower datums have an arrangement upon the pair of L-shaped brackets which enables the adjustment mechanisms of the pair of L-shaped brackets to provide an independent angular adjustment of the build plate along two lateral axes. The vertical movement mechanism is configured to position the fixed vertical portion along a vertical Z-axis. The imaging subsystem is configured to selectively cure layers of photocurable resin above the build plate. The controller is coupled at least to the vertical movement mechanism and the imaging subsystem.

In a third aspect of the disclosure, a method of manufacturing a 3D article includes utilizing a 3D printing system according one of the 3D printing systems described in the first or second aspects of the disclosure supra with a possible inclusion of one or more of the implementations described supra. The method further includes operating adjustment mechanisms of the pair of L-shaped brackets to independently level the build plate about two lateral axes, operating the vertical movement mechanism to position an upper surface of the build plate or 3D article one layer below a build plane, operating the motorized wiper to level resin over the build plane, operating the imaging subsystem to selectively cure the photocurable resin at the build plane, and repeat operating the vertical movement mechanism, the motorized wiper, and the imaging subsystem to complete fabrication of the 3D article.

In an implementation, the pair of L-shaped brackets includes a first bracket and a second bracket. The first bracket includes a first lower end including two separated lower datums that are spaced apart along an X-axis. The second bracket includes a second lower end including a central lower datum laterally located along the X-axis between the lateral X-axis locations of the two separated lower datums. Operating the adjustment mechanisms includes operating a first adjustment mechanism to rotate the build plate about a Y-axis that is perpendicular to the X-axis and operating a second adjustment mechanism to rotate the build plate about the X-axis.

DETAILED DESCRIPTION OF THE PREFERRED EMBODIMENTS

Figure 1:
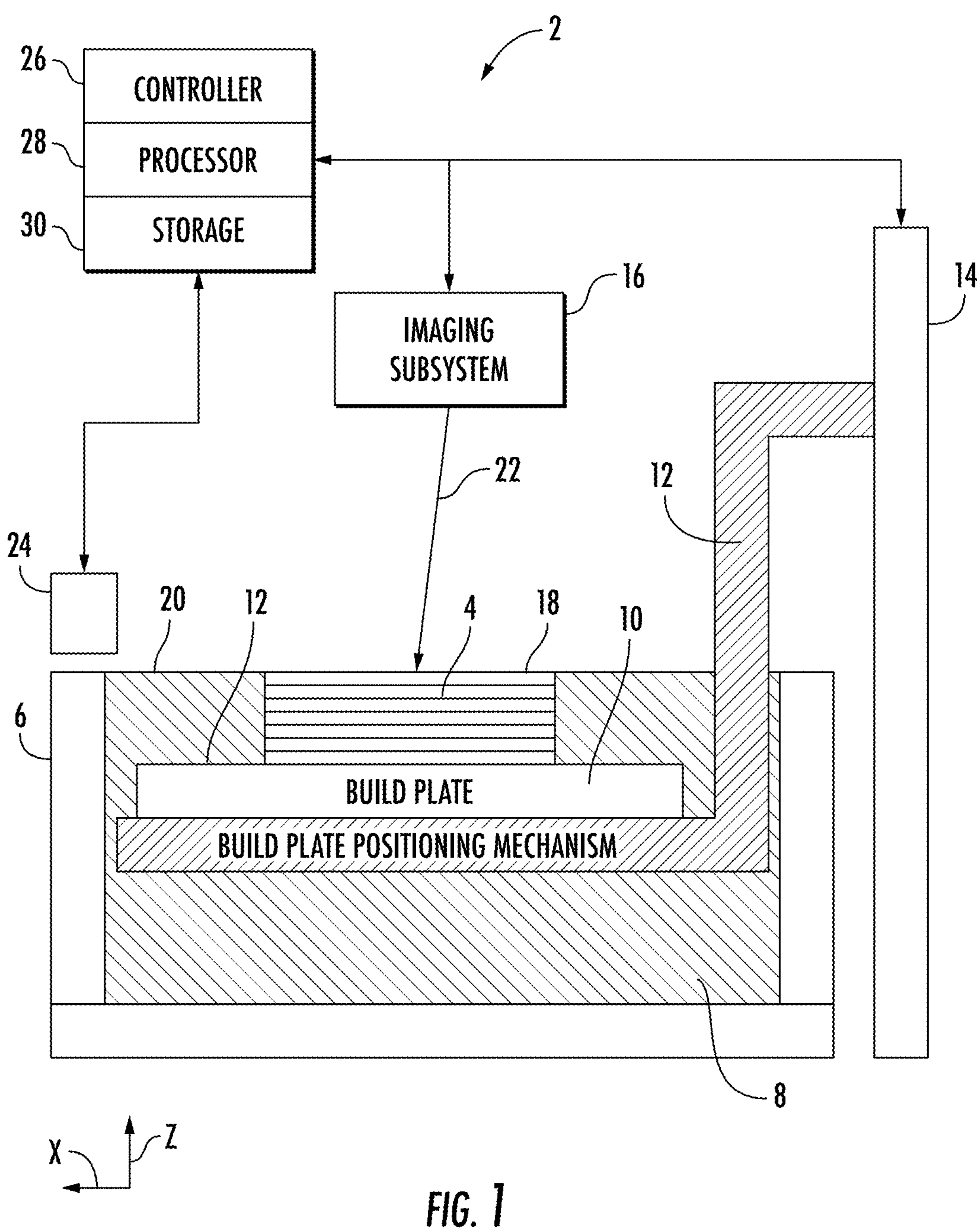
FIG. 1 is a schematic illustration of a three-dimensional (3D) printing system configured for manufacturing a 3D article based on stereolithography.

FIG. 1 is a schematic illustration of a three-dimensional (3D) printing system 2 configured for manufacturing a 3D article 4. In describing system 2, mutually orthogonal axes X, Y, and Z will be utilized and otherwise referred to as an X-axis, a Y-axis, and a Z-axis. Axes X and Y are lateral axes that are generally horizontal. Axis Z is a vertical axis that is generally aligned with a gravitational reference. The term "generally" implies that a direction or magnitude is not necessarily exact but is by design. Terms such as horizontal, vertical, perpendicular, or aligned are generally by engineering design and intent and are accurate to within manufacturing tolerances.

Manufacturing tolerances may be affected factors such as the type of material being used in constructing a component of a system. Manufacturing tolerances may also be affected by a particular process sequence used in fabricating and assembling parts of a system.

3D printing system 2 includes a resin vessel 6 configured to contain a photocurable resin 8. System 2 also includes a build plate 10 that is positioned and supported by a build plate positioning mechanism 12. A vertical movement mechanism 14 is coupled to the build plate positioning mechanism 12. More details concerning the build plate positioning mechanism 12 will discussed infra.

The photocurable resin 8 is a liquid polymer resin that includes, inter alia, one or more monomers and one or more catalysts. The photocurable resin 8 is configured to polymerize and harden from a liquid state to a solid state during a radiation cure process. The radiation cure process includes radiative exposure of the photocurable resin to blue, violet, and/or ultraviolet radiation having a photonic wavelength spectrum within a range of about 100 to 500 nanometers (nm). The radiation cure process can utilize radiation having one or more spectral peaks that are preferably optimized for the catalysts.

In an illustrative embodiment, the vertical movement mechanism 14 includes a motor coupled to a vertical lead screw. The lead screw is threaded into a nut carried by the build plate positioning mechanism 12. As the motor rotates the lead screw about the vertical Z-axis, the action of the lead screw in the nut vertically translates and positions the nut and hence the build plate positioning mechanism 12. Other embodiments are possible. As a first alternative, the vertical movement mechanism 14 can utilize a ball-bearing nut and vertical screw mechanism. As a second alternative, the vertical movement mechanism 14 can utilize a motorized pulley coupled to a belt that translates with the build plate positioning system 12. All such movement mechanisms are known in the art for 3D and 2D printing.

3D printing system 2 includes an imaging subsystem 16 configured to selectively cure a layer of the photocurable resin 8 over a build plane 18. The build plane 18 is defined by lateral limits of the imaging subsystem 16 and a top surface 20 of the photocurable resin 8.

In an illustrative embodiment, the imaging subsystem 16 includes a laser reflected in sequence by two galvanometer mirrors so as to scan a laser beam 22 over the build plane along the X and Y axes. In another embodiment, the imaging subsystem 16 can employ an array of light emitting diodes or lasers that are scanned over the build plane 18. Yet other imaging subsystems can employ light sources and light modulators. The light sources can emit blue, violet, and/or ultraviolet radiation (100-500 nm) for selectively curing layers of the photocurable resin 8. Various types of imaging subsystems 16 are known in the art for stereolithography systems.

System 2 includes a motorized wiper 24 configured to form new layers of the photocurable resin 8 over the 3D article 4. The motorized wiper 24 can include a rubber wiper blade coupled to a horizontal movement mechanism. In an illustrative embodiment, the horizontal movement mechanism can include a belt coupled to the wiper blade and a motorized pully configured to move the belt. Such motorized wipers are known in the art for stereolithography.

A controller 26 is coupled to the vertical movement mechanism 14, the imaging subsystem 16, the motorized wiper or wiper module 24, and other components of the 3D printing system 2. Controller 26 includes a processor 28 coupled to a non-volatile or non-transient information storage 30. Information storage 30 stores software instructions which, upon execution by processor 28, operate the various components of the 3D printing system 2. The controller 26 can be a single module localized to the 3D printing system 2 or it can other computing devices such as a laptop computer, a desktop computer, and/or a remote server.

Figure 2:
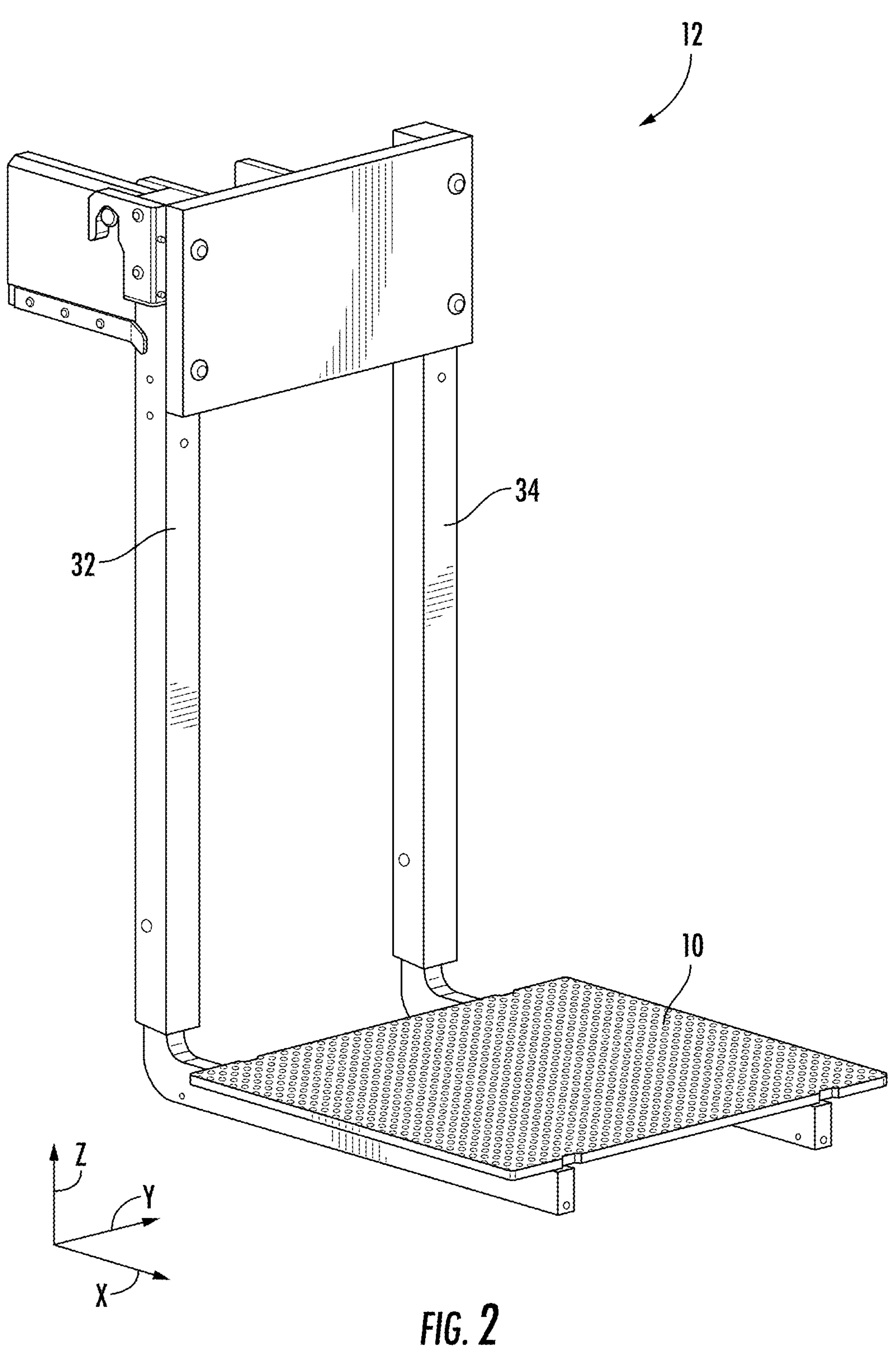
FIG. 2 is an isometric drawing of a build plate mounted upon a build plate positioning mechanism in isolation (without other portions of the 3D printing system).

FIG. 2 is an isometric drawing of the build plate positioning mechanism 12 holding a build plate 10 in isolation. Build plate positioning mechanism 12 includes a pair of L-shaped brackets 32, 34 including a first bracket 32 and a second bracket 34. The vertical movement mechanism 16 is configured to position the build plate positioning system 12 along the vertical Z-axis.

Figure 3:
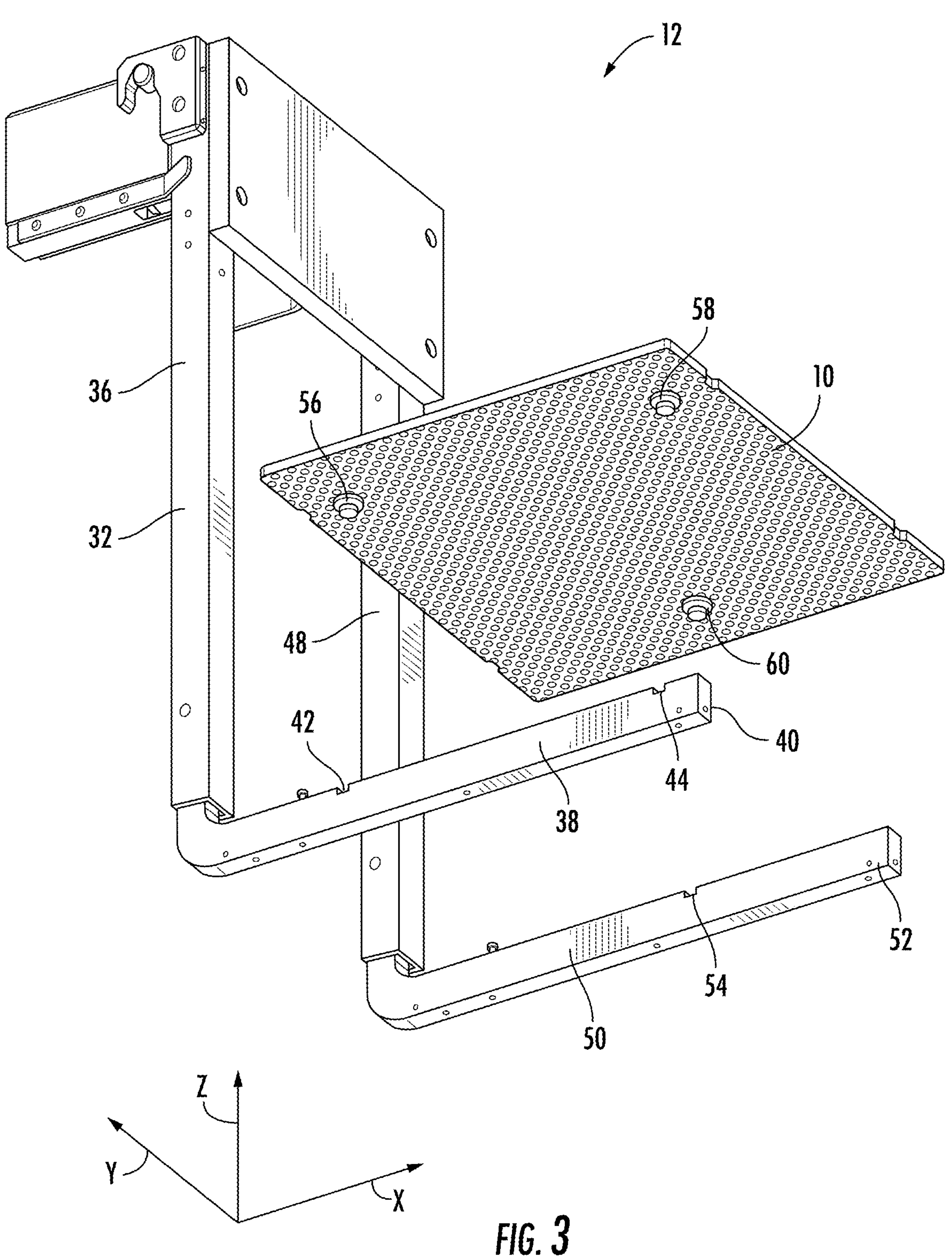
FIG. 3 is an isometric view of the build plate positioning mechanism and the build plate separated from each other to illustrate certain features.

FIG. 3 is an isometric view of the build plate positioning mechanism 12 and the build plate 10 separated from each other. The first bracket 32 includes a first vertical section 36 and a first lower end 38. The first lower end 38 extends from the first vertical section 36 along the X-axis to a distal end 40. The first lower end 38 includes two separated lower datums 42, 44 including a proximal datum 42 that is relatively close to the first vertical section 36 and a distal datum 44 that is near the distal end 40. The two separated lower datums 42 and 44 are spaced from each other with respect to the X-axis.

The second bracket 34 includes a second vertical section 48 and a second lower end 50. The second lower end 50 extends from the second vertical section 48 in along the X-axis to a distal end 52. The second lower end 50 includes a central datum 54 that is located between the two separated lower datums 42 and 44 with respect to the X-axis (and also spaced along the Y-axis).

The pair of L-shaped brackets 32, 34 collectively have a plurality or three lower datums 42, 44, and 54 that form a triangular arrangement. The plurality of lower datums 42, 44, and 54 define a base of the triangle along the first lower end 38, the base having endpoints 42 and 44. The plurality of lower datums 42, 44, and 54 define a vertex of the triangle at 54. The build plate 10 has a plurality of upper datums 56, 58, and 60 that correspond to the three lower datums 42, 44, and 54 respectively. When the build plate 10 is placed upon the pair of L-brackets 32, 34 the (1) separated lower datums 42 and 44 of the first bracket 32 engage the upper datums 56 and 58 of the build plate 10 and (2) the central lower datum 54 of the second bracket 34 engages the central upper datum 60 of the build plate.

Figure 4:
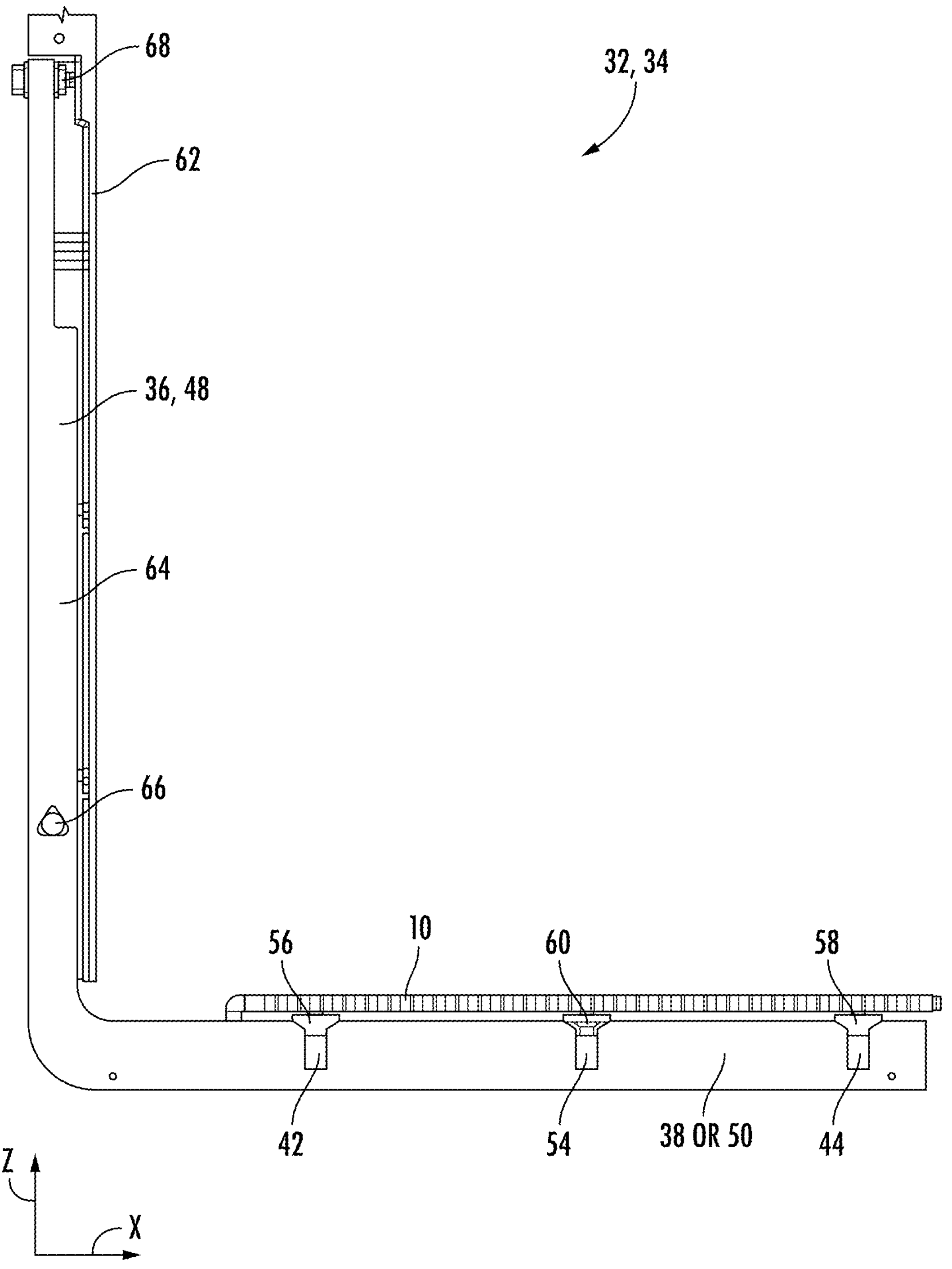
FIG. 4 is a "collapsed" side view of a pair of L-shaped brackets to illustrate various features including an adjustment mechanism and datums. The central lower datum is spaced in Y from the separated lower datums which are on either side in X.

FIG. 4 is a "collapsed" side view of the pair of L-shaped brackets 32, 34 to illustrate additional aspects. The upper datums 56, 58, and 60 are received within the lower datums 42, 44, and 54 respectively. Also, the datum pair 54/60 is at about a midpoint between the datum pairs 42/56 and 44/58 with respect to the X-axis. Note that the datum pairs 42/56 and 44/58 engage along the first lower end 38 of the first bracket 32. The datum pair 54/60 engages along the second lower end 50 of the second bracket 34.

The pair of L-shaped brackets 32, 34 individually include a fixed vertical portion 62 and a movable portion 64. The fixed vertical portion 62 is "fixed" in the sense that it is constrained to vertical motion imparted by the vertical movement mechanism 14. The movable portion 64 includes the lateral lower end (38 or 50) and is pivotally or rotatively mounted to the fixed vertical portion 62 by a pin 66. The pin 66 extends outward in the Y-direction (parallel to Y-axis) from the fixed vertical portion 62 and through the moveable portion 64. Near the top of the vertical section 36, 48 is a screw jack mechanism 68. A nut on the screw jack mechanism 68 can be turned to adjust a distance (generally along the X-axis) between the fixed vertical portion 62 and the movable portion 64. Turning the nut has the effect of rotating the lateral lower end (38 or 50) about the pin 66 and therefore about the Y-axis. Such adjustment of orientation of the lateral lower end (38 or 50) can be performed for the first bracket 32 and the second bracket 34 independently. The combination of the pin 66 and screw jack mechanism 68 can be referred to as a "first or second mechanism" as regards to the first 32 and second 34 brackets respectively.

Figure 5:
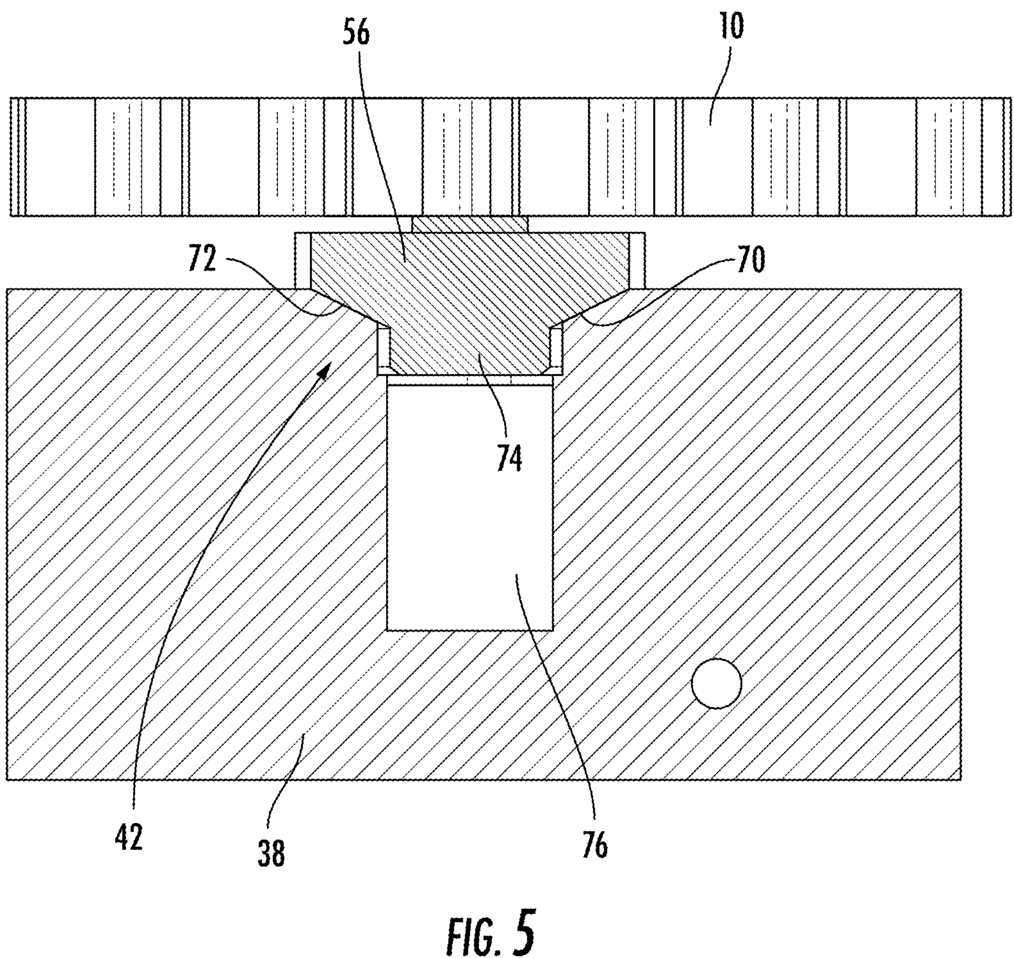
FIG. 5 is a detail cross-sectional view illustrating a single datum pair including an upper datum received into a lower datum.

FIG. 5 is a detail cross-sectional view that focuses on a single datum pair including an upper and lower datum in engagement. For purposes of illustration, this can be datum pair 42/56 but the details of FIG. 5 apply to all three datum pairs introduced supra.

The lower datum 42 is an opening configured to receive and align to the upper datum 56. The lower datum 42 has a conical lead-in surface 70. The upper datum 56 has a truncated conical shaped surface 72 that is complementary to the conical lead in surface 70. As the build plate 10 is lowered onto the lower end 38 of the first bracket 32, a leading lower end 74 of the upper datum 56 engages and self-aligns to the lead-in surface 70.

The datum 42 also includes a permanent magnet 76 which is press fit and/or adhesively bonded into the datum 42. The datum 56 is formed from a ferromagnetic material that can include iron, cobalt, and/or nickel. In an illustrative embodiment, the permanent magnet 76 is a rare earth magnet formed from neodymium.

Figure 6A:
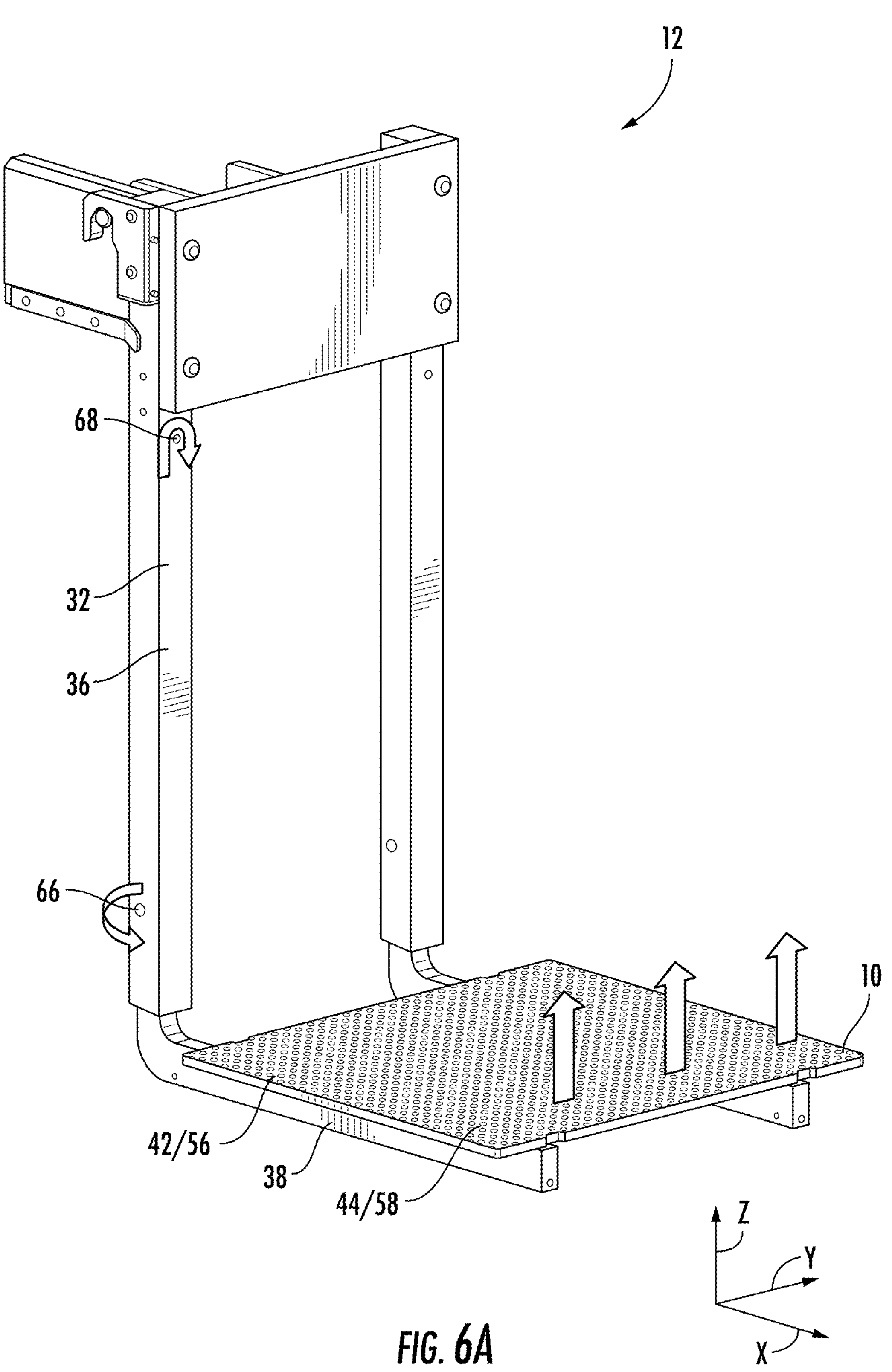
FIG. 6A is an isometric view of the build plate upon the build plate positioning mechanism and used to illustrate use of the first adjustment mechanism to adjust orientation of the build plate about the Y-axis.
Figure 6B:
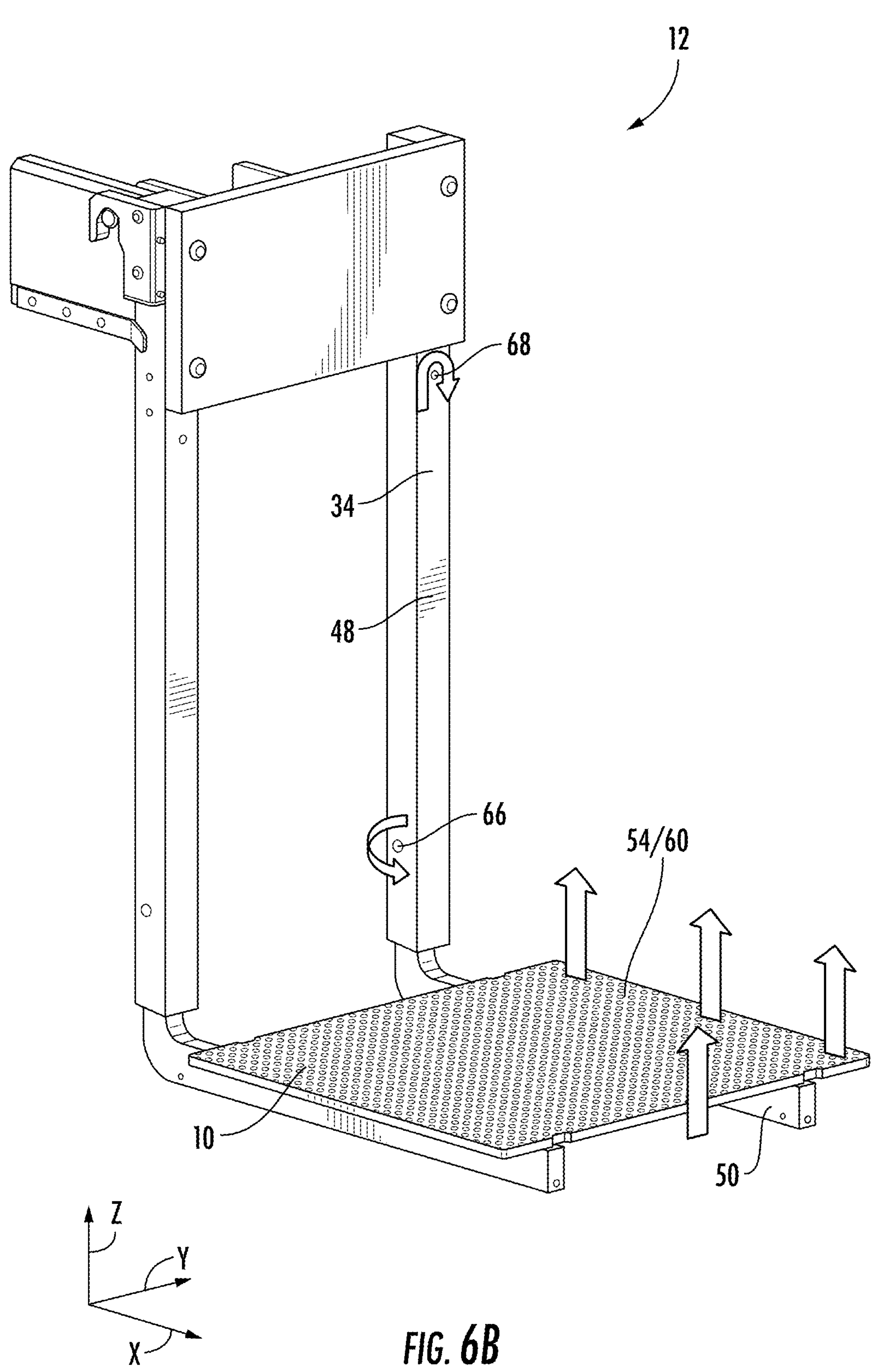
FIG. 6B is an isometric view of the build plate upon the build plate positioning mechanism and used to illustrate use of the second adjustment mechanism to adjust orientation of the build plate about the X-axis.

FIGS. 6A and 6B illustrate leveling the build plate 10 about lateral axes Y and X respectively. Adjustment mechanisms of the first 32 and second 34 brackets work the same way, but the rotation is generally about orthogonal axes due to the placement geometry of the datum pairs under the pair of L-brackets 32 and 34.

Referring to FIG. 6A, adjusting the screw jack 68 alters a distance between fixed 62 and movable 64 portions (FIG. 4) of the first vertical section 36 at the screw jack 68. This in turn rotates the first lower end 38 with respect to the pin 66. The rotation results in a change in relative height for the proximal 42/56 and distal 44/58 datum pairs. The effect is to therefore primarily rotate the build plate 10 about the Y-axis.

The block arrow at screw jack 68 indicates a direction it is being manually or automatically turned. The block arrow at pin 66 indicates a horizontal axis of rotation of the first lower end 38 with respect to the fixed portion 62. The vertical block arrows indicate upward motion and rotation of the build plate 10. A distal (+X) end of the build plate 10 is raised more than a proximal (−X) end and thus it is rotated primarily about the Y-axis.

Referring to FIG. 6B, adjusting the screw jack 68 alters a distance between fixed 62 and movable 64 portions (FIG. 4) of the second vertical section 48 at the screw jack 68. This in turn rotates the second lower end 50 with respect to the pin 66. The rotation results in a change in height of the central 54/60 datum pair. The effect is to rotate the build plate 10 about the other datum pairs 42/56, 44/58 and therefore about the X-axis.

The block arrow at screw jack 68 indicates a direction it is being manually or automatically turned. The block arrow at pin 66 indicates a horizontal axis of rotation of the second lower end 50 with respect to the fixed portion 62. The vertical block arrows indicate upward motion and rotation of the build plate 10. An end of the build plate 10 above the second lower end 50 (+Y) is being raised relative to an end adjacent to the first lower end 38 (−Y). Thus, the build plate 10 is being rotated primarily about the X-axis.

Figure 7:
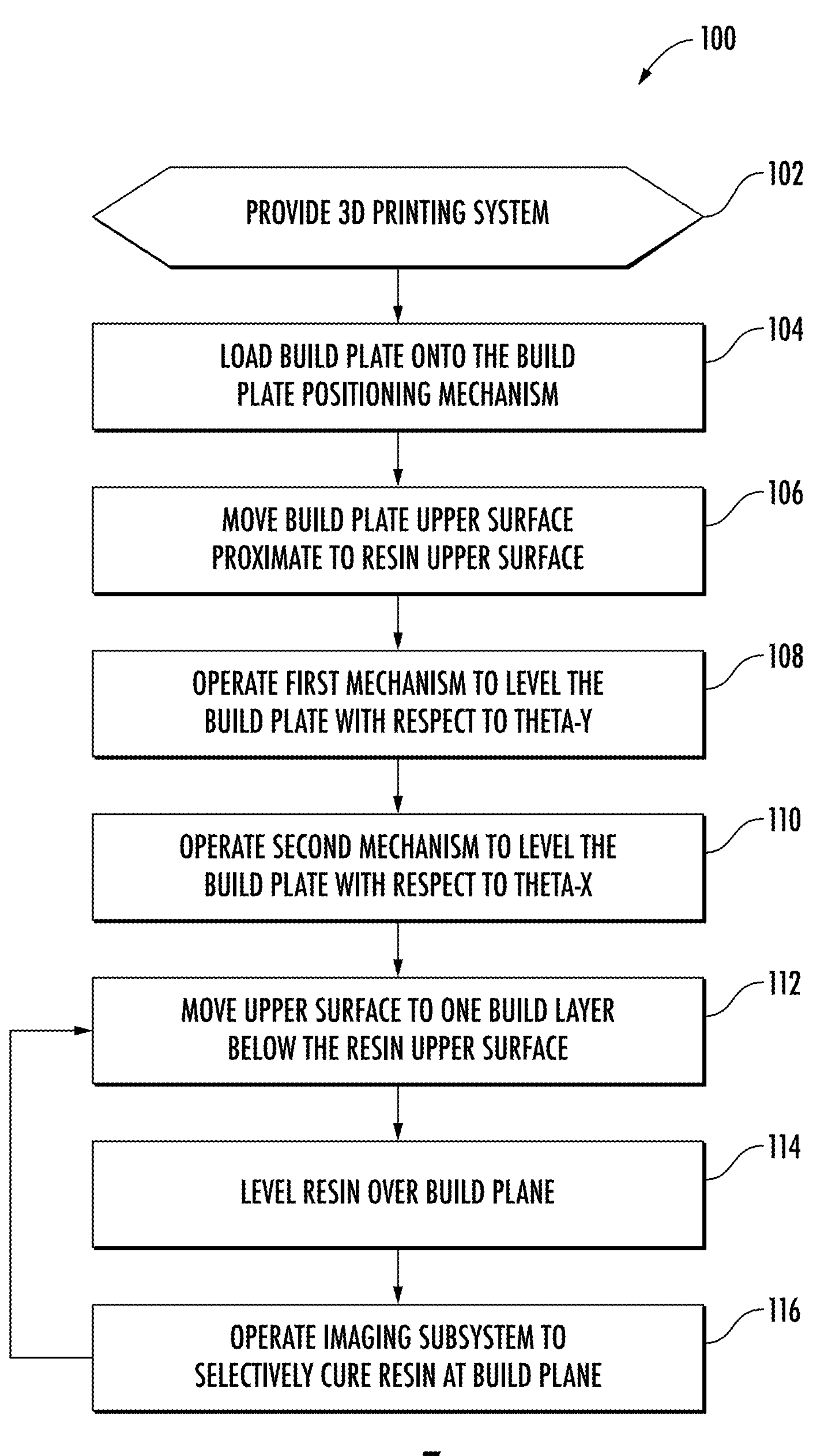
FIG. 7 is a flowchart depicting a method of manufacturing a 3D article.

FIG. 7 is a flowchart depicting a method of manufacturing a 3D article 4 utilizing the 3D printing system 2 provided according to 102. Some of steps 104-116 can be performed manually for some embodiments. Alternatively, all of steps 104-116 can be performed by the execution of software in controller 26.

According to 104, build plate 10 is loaded onto the build plate positioning mechanism 12. As part of step 104, the datum pairs engage, as described with respect to FIG. 5.

According to 106, the vertical movement mechanism 14 is operated to move an upper surface of build plate 10 proximate to the resin upper surface 20. As part of step 106, a divergence of the upper surface of the build plate 10 from being level is observed either manually or in an automated fashion (the latter by perhaps scanning the upper surface with a distance sensor).

According to step 108, the first mechanism of first bracket 32 is adjusted to level the build plate with respect to theta-Y or about the Y-axis. This step has been described with respect to FIGS. 4 and 6A by adjusting the screw jack 68 of the first bracket 32.

According to 110, the second mechanism of second bracket 34 is adjusted to level the build plate with respect to theta-X or about the X-axis. This step has been described with respect to FIGS. 4 and 6B by adjusting the screw jack 68 of the second bracket 34. Steps 108 and 110 can be repeated as required to obtain precise leveling of the top surface of build plate 10 to the resin surface 20.

According to 112, the vertical movement mechanism 14 is operated to move the upper surface (of the build plate 10 or later the forming 3D article 4) to one build layer (one slice layer thickness) below the resin upper surface 20. According to 114, the wiper module is operated to level the resin over the build plane 18. The build plane 18 is essentially the area to be operated on by the imaging module and the resin upper surface 20. According to 116, the imaging subsystem 16 is operated to selectively cure a layer of the photocurable resin 8 at the build plane 18. Steps 112-116 are repeated until fabrication of the 3D article 4 is complete.

The specific embodiments and applications thereof described above are for illustrative purposes only and do not preclude modifications and variations encompassed by the scope of the following claims.

What is claimed:

1. A three-dimensional printer comprising:
- a resin vessel;
- a build plate positioning mechanism including:
  - a pair of brackets including:
    - a first bracket including a first vertical section and a first lower end;
      - the first lower end extending from the first vertical section along a lateral X-axis to a distal end;
      - the first vertical section including a first adjustment mechanism configured to rotatively position the first lower end about a first pivot axis;
      - the first lower end including two separated lower datums that are spaced apart along the X-axis;
    - a second bracket including a second vertical section and a second lower end;
      - the second lower end extending from the second vertical section along the lateral X-axis to a distal end;
      - the second vertical section including a second adjustment mechanism configured to rotatively position the second lower end about a second pivot axis;
      - the second lower end including a central lower datum laterally located along the X-axis between the lateral X-axis locations of the two separated lower datums; and
- a build plate configured to be supported by a plurality of lower datums that include the two separated lower datums and the central lower datum;
- actuating the first adjustment mechanism causes a relative vertical displacement of the two separated lower datums which rotates the build plate about a Y-axis which is perpendicular to the X-axis; and
- actuating the second adjustment mechanism causes a vertical displacement of the central lower datum which rotates the build plate about the X-axis.

2. The three-dimensional printer of claim 1 wherein the first pivot axis and the second pivot axis are individually parallel to the Y-axis.

3. The three-dimensional printer of claim 1 wherein the central lower datum engages the build plate at a midpoint between the separated lower datums with respect to the X-axis.

4. The three-dimensional printer of claim 1 further comprising a vertical movement mechanism coupled to the build plate positioning mechanism and configured to position the build plate along a vertical Z-axis.

5. The three-dimensional printer of claim 4 further comprising an imaging subsystem configured to selectively cure layers of photocurable resin above the build plate over a build plane.

6. The three-dimensional printer of claim 5 further comprising a controller coupled to the vertical movement mechanism and the imaging subsystem.

7. The three-dimensional printer of claim 1 wherein the build plate includes a plurality of upper datums including two separated upper datums and a central upper datum configured to engage the separated lower datums and the central lower datum respectively.

8. The three-dimensional printer of claim 7 wherein the plurality of lower datums include a plurality of magnets therein, the plurality of upper datums are formed from magnetic material that is magnetically coupled to the plurality of magnets when the build plate is placed upon the plurality of lower datums.

9. The three-dimensional printer of claim 7 wherein the plurality of lower datums are openings having conical lead-in surfaces, the plurality of upper datums have truncated conical surfaces that are received by the conical lead-in surfaces when the build plate is loaded onto the plurality of lower datums.

10. The three-dimensional printer of claim 1 wherein the first vertical segment includes a first fixed vertical portion and a first movable portion that includes the first lateral lower end.

11. The three-dimensional printer of claim 10 wherein the first fixed vertical portion includes a pin extending through the first movable portion along the Y-axis to allow rotation of the first movable portion with respect to the first fixed vertical portion about the Y-axis, the first vertical segment further includes a first actuator above the pin configured to allow a linear adjustment of relative location between the first movable portion and the first fixed vertical portion along the X-axis to provide an angular adjustment of the first lateral lower end about the Y-axis.

12. The three-dimensional printer of claim 10 wherein motion of the first fixed vertical portion is limited to vertical motion.

13. The three-dimensional printer of claim 12 wherein first mechanism is configured to angularly position the first movable portion with respect to the first fixed vertical portion about the Y-axis.

14. The three-dimensional printer of claim 1 wherein the second vertical segment includes a second fixed vertical portion and a second movable portion that includes the second lateral lower end.

15. The three-dimensional printer of claim 14 wherein the second fixed vertical portion includes a pin extending through the second movable portion along the Y-axis to allow rotation of the second movable portion with respect to the second fixed vertical portion about the Y-axis, the second vertical segment further includes a second actuator above the pin configured to allow a linear adjustment of relative location between the second movable portion and the second fixed vertical portion along the X-axis to provide an angular adjustment of the second lateral lower end about the Y-axis.

16. The three-dimensional printer of claim 14 wherein motion of the second fixed vertical portion is limited to vertical motion.

17. The three-dimensional printer of claim 16 wherein second mechanism is configured to angularly position the first movable portion with respect to the first fixed vertical portion about the Y-axis.

18. A three-dimensional printer comprising:
- a resin vessel;
- a build plate positioning mechanism including a pair of L-shaped brackets that individually include:
  - a fixed vertical portion constrained to vertical motion;
  - a movable portion that coupled to the fixed vertical portion, the movable portion including a lateral lower end;
  - an adjustment mechanism configured to adjust and set an angular position of the lateral lower end with respect to the fixed vertical portion;
- a plurality of lower datums arranged upon the pair of L-shaped brackets;
- a build plate having a plurality of upper datums configured to engage and align to the plurality of lower datums when the build plate is placed upon the pair of L-shaped brackets;
- the plurality of lower datums having an arrangement upon the pair of L-shaped brackets which enables the adjustment mechanisms of the pair of L-shaped brackets to provide an independent angular adjustment of the build plate along two lateral axes;
- a vertical movement mechanism configured to position the fixed vertical portion along a vertical Z-axis;
- an imaging subsystem configured to selectively cure layers of photocurable resin above the build plate; and
- a controller coupled at least to the vertical movement mechanism and the imaging subsystem.

19. A method of manufacturing a three-dimensional (3D) article comprising:
- providing a 3D printing system including:
  - a resin vessel containing photocurable resin;
  - a build plate positioning mechanism including a pair of L-shaped brackets that individually include:
    - a fixed vertical portion constrained to vertical motion;
    - a movable portion that coupled to the fixed vertical portion, the movable portion including a lateral lower end;
    - an adjustment mechanism configured to adjust and set an angular position of the lateral lower end with respect to the fixed vertical portion;
  - a plurality of lower datums arranged upon the pair of L-shaped brackets;
  - a build plate having a plurality of upper datums configured to engage and align to the plurality of lower datums when the build plate is placed upon the pair of L-shaped brackets;
  - the plurality of lower datums having an arrangement upon the pair of L-shaped brackets which enables the adjustment mechanisms of the pair of L-shaped brackets to provide an independent angular adjustment of the build plate along two lateral axes;
  - a vertical movement mechanism configured to position the fixed vertical portion along a vertical Z-axis;
  - a motorized wiper;
  - an imaging subsystem configured to selectively cure layers of photocurable resin above the build plate;

operating adjustment mechanisms of the pair of L-shaped brackets to independently level the build plate about two lateral axes;

operating the vertical movement mechanism to position an upper surface of the build plate or 3D article one layer below a build plane;

operating the motorized wiper to level resin over the build plane; and operating the imaging subsystem to selectively cure the photocurable resin at the build plane;

repeat operating the vertical movement mechanism, the motorized wiper, and the imaging subsystem to complete fabrication of the 3D article.

20. The method of claim 19 wherein the pair of L-shaped brackets includes a first bracket and a second bracket, the first bracket includes a first lower end including two separated lower datums that are spaced apart along an X-axis, the second bracket includes a second lower end including a central lower datum laterally located along the X-axis between the lateral X-axis locations of the two separated lower datums, operating the adjustment mechanisms includes operating a first adjustment mechanism to rotate the build plate about a Y-axis that is perpendicular to the X-axis and operating a second adjustment mechanism to rotate the build plate about the X-axis.

* * * * *